Figure 1:
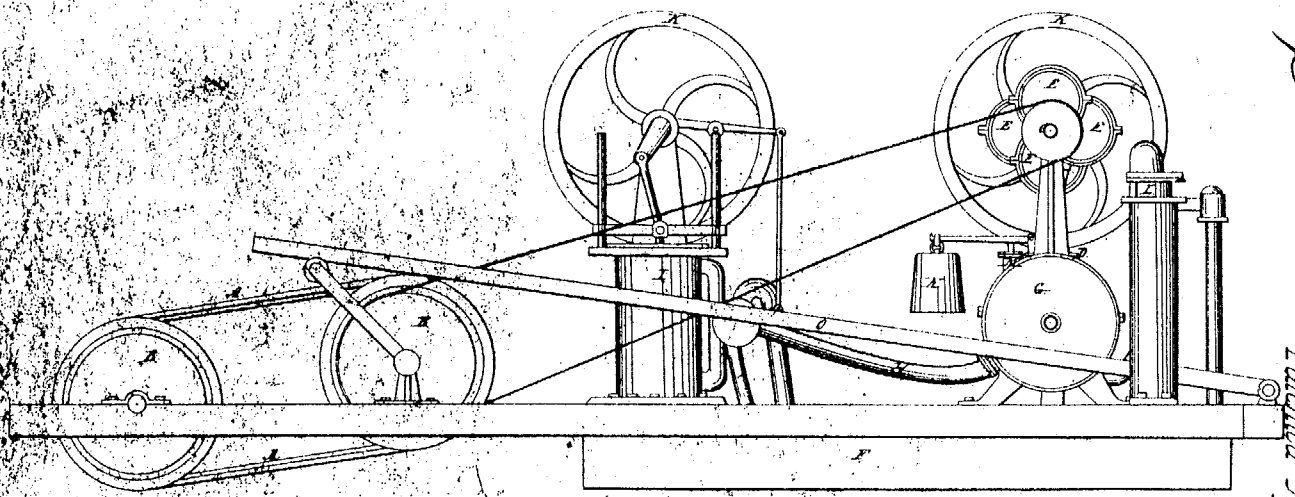
Figure 2:
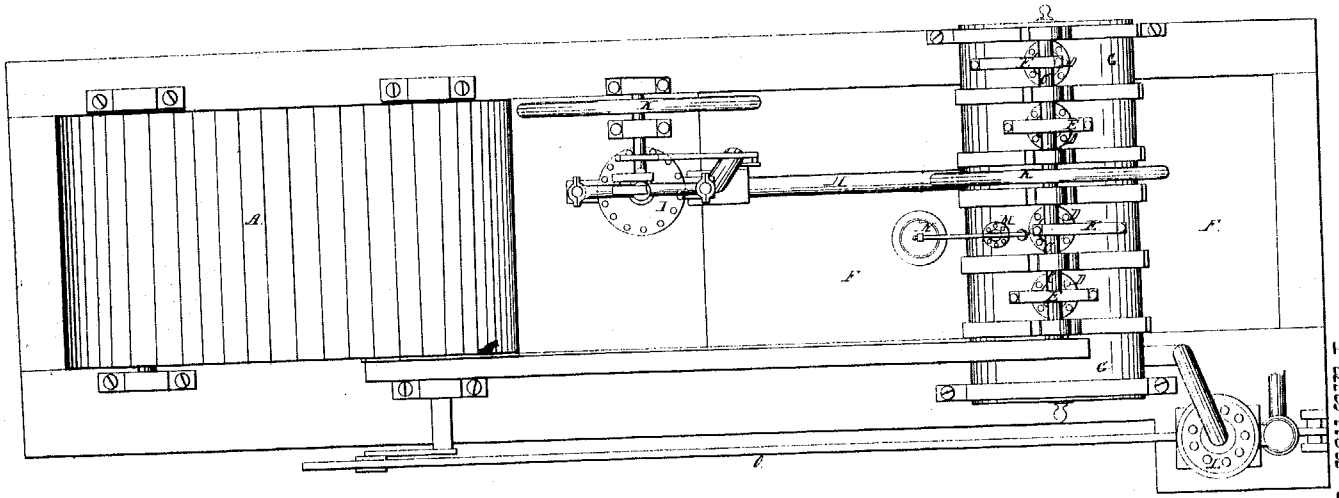

417-521

BEST AVAILABLE COPY

Sheet 1-3 Sheets.

I. P. Codman,

Force Pump, 7,548 X

Patented Apr. 20, 1833.

702

BEST AVAILABLE COPY

103. PUMPS,

169

Sheet 2-3 Sheets

T. P. Codman.

Force Pump.

Patented Apr. 20, 1833.

N. PETERS, PHOTO-LITHOGRAPHER, WASHINGTON D. C.

103. PUMPS.
BEST AVAILABLE COPY
169
Sheet 3-3 Sheets
T. P. Codman
Force Pump
Patented Apr. 20. 1833.
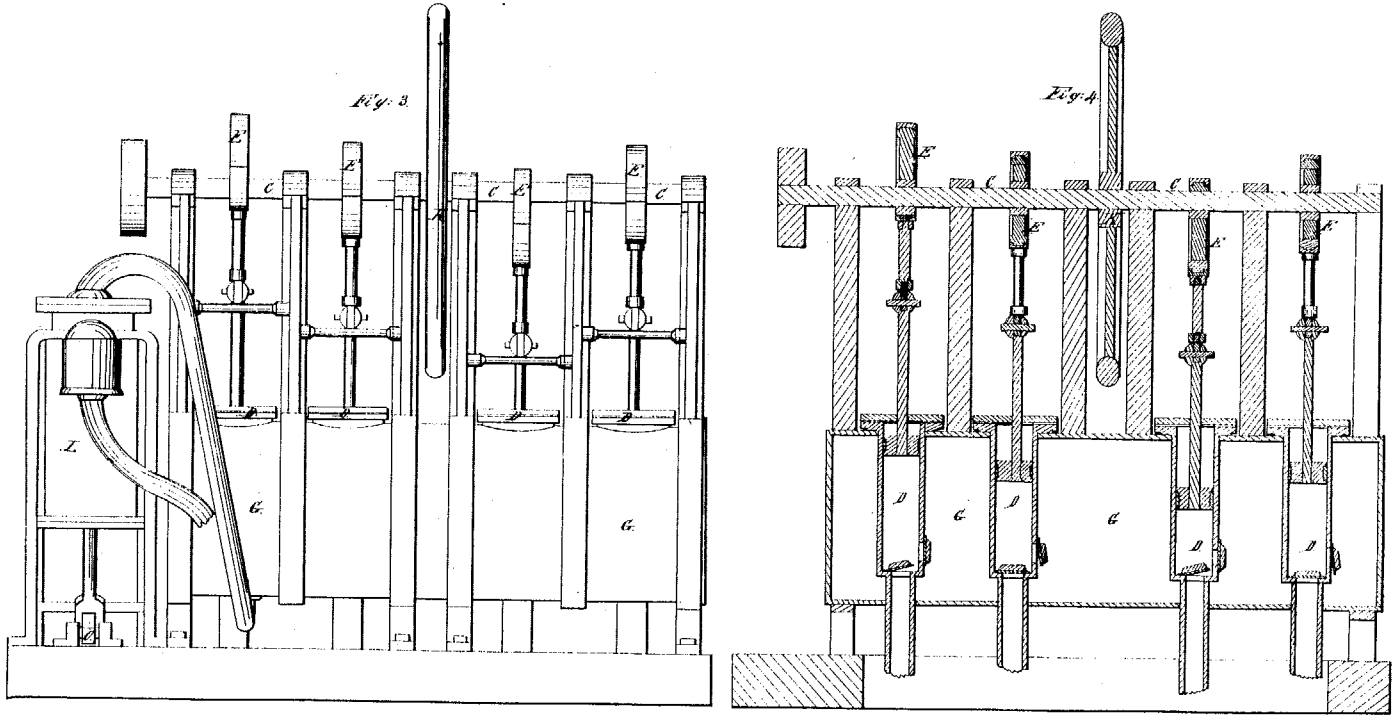
N. PETERS, PHOTO-LITHOGRAPHER, WASHINGTON, D. C.

75488 Apl 20, 1833

Thomas P. Codman

Letters Patent

The Schedule referred to in these Letters Patent and making part of the
Same Containing a description in the words of the said Thomas P. Codman
himself of his Improvement being a Mode of Condensing Air & Water
& Animal power, and applying them in such a manner as to propel various
kinds of Machinery As many horses or other suitable animals as are ne-
-cessary are placed on a revolving Platform constructed in the following
manner Several Cylindrical pieces of wood are strung together and plac-
-ed round two large Drums or Cylinders which form a revolving Platform
they are made to turn a horizontal Shaft to which is attached a number
of forcing pumps by means of eccentrics they raise water from a Cistern
and force it into a cylinder in which they stand the air within this Cylinder
is not suffered to escape consequently the increase of water from the pumps
compresses the air on its surface the elastic force of the compressed air forces
the water from the Cylinder thro' a tube leading from the bottom of the Cyl-
-inder into another Cylinder the water passes the top & bottom successively of a
piston contained within this Cylinder and escapes thro' two pipes one leading
from the top the other leading from the bottom of this Cylinder into the Cistern
from whence it was taken, where it is again taken up and passes thro' the
same routine as before Specified A condensing Air pump is attached to the
first named Cylinder which may be used to force the air to the pressure of
several atmospheres There is likewise on the same Cylinder a pressure
valve to shew the pressure within. On the Shaft that the pumps are attached
to the eccentrics are placed at different angles so that the water may be
forced in repeatedly which keeps up the pressure of the air within.

There is also on each
of the shafts a Balance wheel for regulating the motion. If I make use of air in
stead of water I place condensing air pumps where the water pumps are

[illegible]. 7548X situation [illegible] dispense with the Water Pumps & Water the Air acting in the Cylinder the same as the Water. Any Machine to be propelled may be attached either by Cranks or Bands to the piston rod [illegible] or Shaft of the [illegible] named Cylinder & the Velocity may be increased or decreased by increasing or decreasing the Size of the Drums that the Bands run on

What I claim as my im-provement & discovery is the manner herein described of Combining & also ap-plying the herein Specified powers so as to propel various kinds of Machinery

Witnesses
Charles Henshaw
John Henshaw

Thomas P. Codman

[illegible]

[ 504 words